US008800645B2

(12) United States Patent
Drake et al.

(10) Patent No.: US 8,800,645 B2
(45) Date of Patent: Aug. 12, 2014

(54) HIGH FLOW INTAKE SYSTEM FOR SUBMERSIBLE PUMPS

(75) Inventors: Derric Drake, Stillwater, OK (US); Mikel Eric Janitz, Sapulpa, OK (US); Justin Clark, Stillwater, OK (US)

(73) Assignee: Submersible Pumps, Inc., Cushing, OK (US)

( * ) Notice: Subject to any disclaimer, the term of this patent is extended or adjusted under 35 U.S.C. 154(b) by 45 days.

(21) Appl. No.: 13/046,267

(22) Filed: Mar. 11, 2011

(65) Prior Publication Data

US 2011/0220343 A1 Sep. 15, 2011

Related U.S. Application Data

(60) Provisional application No. 61/313,514, filed on Mar. 12, 2010.

(51) Int. Cl.
*E21B 43/00* (2006.01)

(52) U.S. Cl.
USPC ... 166/75.11; 166/68.5; 137/597; 137/565.26

(58) Field of Classification Search
USPC .................. 166/68.5, 75.11; 137/597, 565.26
See application file for complete search history.

(56) References Cited

U.S. PATENT DOCUMENTS 410,597 A * 9/1889 Knight .......................... 137/597
2,148,414 A 2/1939 Wolfert et al.
3,476,907 A 11/1969 Foex et al.
3,760,842 A 9/1973 Mikiya
3,802,966 A 4/1974 Delekto et al.
4,593,716 A 6/1986 Cesna
4,688,599 A 8/1987 Zeman
5,395,352 A 3/1995 Penny
5,596,961 A * 1/1997 Faber ....................... 123/184.38
5,670,093 A 9/1997 Payne
5,908,288 A 6/1999 Moran
6,116,225 A 9/2000 Thomas et al.
6,557,628 B2 5/2003 Ohmer
6,964,306 B2 11/2005 Bunney
7,478,673 B2 1/2009 Boyd
2008/0067712 A1 3/2008 Osada et al.
2009/0008105 A1 1/2009 Price et al.
2009/0044619 A1 2/2009 Fiering et al.
2009/0246039 A1 * 10/2009 Haack et al. .................. 417/244
2009/0308609 A1 * 12/2009 Curole et al. ................ 166/275

* cited by examiner

*Primary Examiner* — Cathleen R Hutchins
*Assistant Examiner* — Taras P Bemko
(74) *Attorney, Agent, or Firm* — Fellers, Snider, Blankenship, Bailey & Tippens, P.C.

(57) ABSTRACT

A high flow intake system for a horizontal pump skid installation is provided for reducing cavitation and for eliminating a necessity to have a booster pump. A pump inlet assembly has a collar that is affixed to a horizontal pump body proximate a pump intake. The pump inlet assembly has a plurality, e.g., four, inlet members that protrude from the collar member at an angle, preferably, 30 degrees, from a longitudinal axis of the pump body. Each of a plurality of hoses is connected to one of the plurality of inlet members. A distribution manifold has an inlet and a plurality of outlets that receive the second ends of the hoses. Preferably, each of the hoses has a length that is at least 20 times an inner diameter so that fluid passing through each of the hoses develops laminar flow.

12 Claims, 6 Drawing Sheets

HIGH FLOW INTAKE SYSTEM FOR SUBMERSIBLE PUMPS

CROSS REFERENCE TO RELATED APPLICATIONS

This application claims the priority of U.S. Provisional Patent Application No. 61/313,514 entitled "HIGH FLOW INTAKE SYSTEM FOR SUBMERSIBLE PUMPS," filed Mar. 12, 2010, the contents of which are hereby incorporated by reference.

FIELD OF THE INVENTION

The invention relates to a high flow intake system. More particularly, the invention relates to an intake system for use with submersible pumps and horizontal pump skid installations for the oil and gas industry.

BACKGROUND OF THE INVENTION

FIG. 1 shows a typical prior art horizontal pump skid installation 10 for the oil and gas industry, which may be used for deep well water injection. Horizontal pump skid installation 10 has a pump 12 having inlet 14 and an outlet 16. Right angle fitting 20 is provided at pump intake 14. Right angle fitting 20 results in pressure losses in a typical intake system 18. In most cases, pressure losses are significant enough to require a boost pump 22 to be installed in series with the main pump 12. Boost pump 22 is an added expense. However, boost pump 22 is necessary to provide additional inlet pressure to overcome the pressure losses associated with fluid flowing through the 90 degree inlet of right angle inlet fitting 20. Without boost pump 22, the main pump 12 could suffer significantly from cavitation issues.

FIG. 2 shows a close-up view of the intake system 18 of the horizontal pump system 10 of FIG. 1. The arrows highlight the flow path through the 90 degree fitting of right angle fitting 20 that is typical of equipment used throughout the industry for horizontal pump intakes 14.

SUMMARY OF THE INVENTION

A high flow intake system for a horizontal pump skid installation is provided to avoid pressure drops associated with the prior art. The high flow intake system of the invention includes a horizontal pump body having an intake and an outlet. A pump inlet assembly is proximate the intake. The pump inlet assembly has a collar member and a plurality of inlet members extending from the collar member. In a preferred embodiment, the pump inlet assembly has four inlet members that each protrude from the collar member at a 30 degree angle.

A distribution manifold is provided that has an inlet and a plurality of outlets. A plurality of hoses is provided wherein each of the hoses connects one of the plurality of outlets of the distribution manifold with one of said plurality of inlet members of the collar member. Preferably, each of the hoses has a length that is at least 20 times the inside diameter of the hose so that fluid passing through the hose may develop laminar flow.

DETAILED DESCRIPTION OF THE PREFERRED EMBODIMENTS

Figure 3:
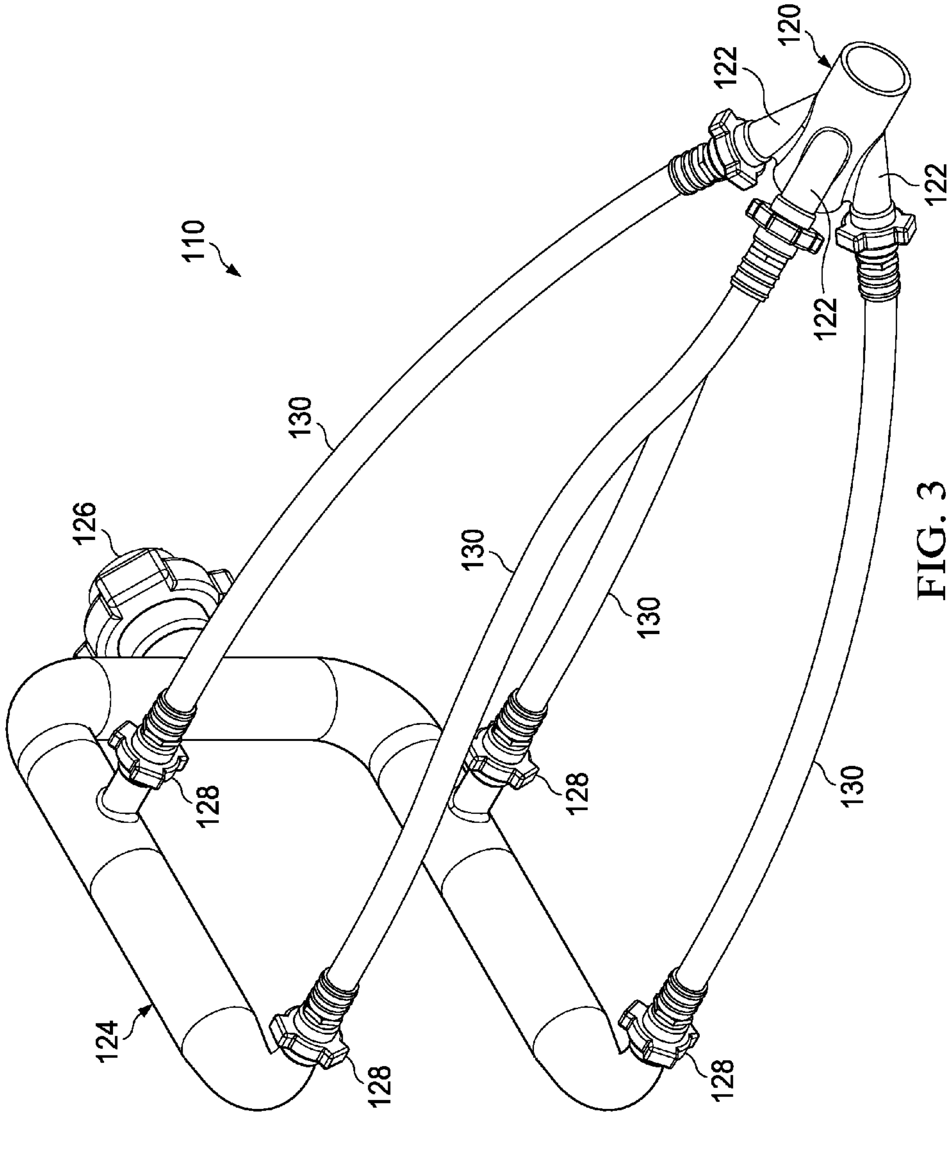
FIG. 3 is a perspective view of the high flow intake system of the invention.
Figure 4:
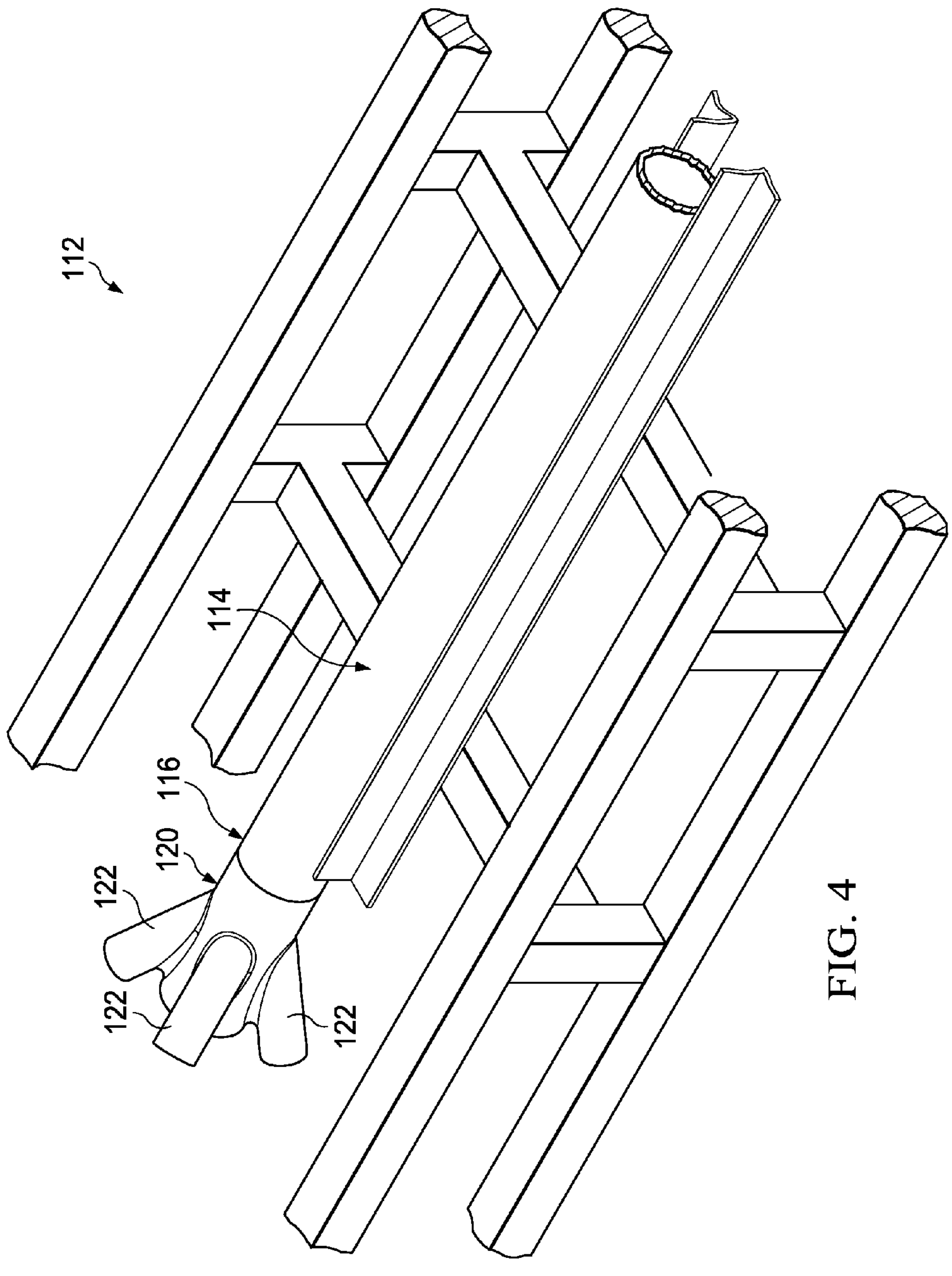
FIG. 4 is an enlarged perspective view of the collar member of the high flow intake assembly of FIG. 3, shown installed proximate a pump intake.
Figure 5:
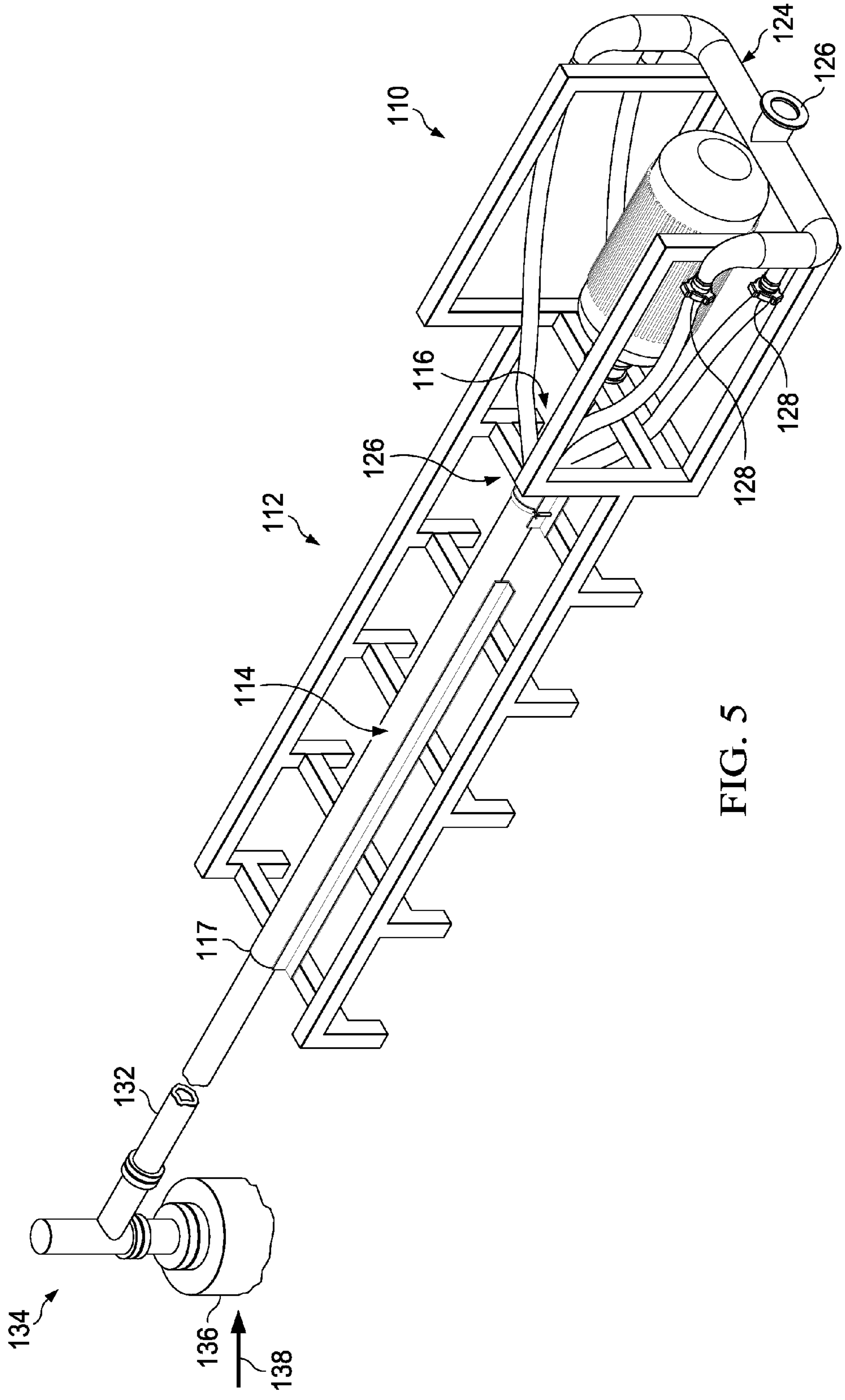
FIG. 5 is a perspective view of a horizontal skid pump and high flow intake system of the invention attached to a wellhead.

Referring now to FIGS. 3 and 4, a high flow intake system for a horizontal pump skid installation, designated generally 110, is shown. Horizontal pump skid installation 112 (FIGS. 4-6) includes a horizontal pump body 114 having an intake 116 and an outlet 117 (FIG. 5). High flow intake system 110 has a collar member 120 and a plurality of inlet members 122 extending from collar member 120. Collar member 120 of high flow intake system 110 is proximate pump intake 116. In a preferred embodiment, intake system 110 has four inlet members 122 that preferably protrude from collar member 120 at an angle between 25° and 45° preferably at a 30 degree angle with respect to a longitudinal axis of pump body 114.

Figure 6:
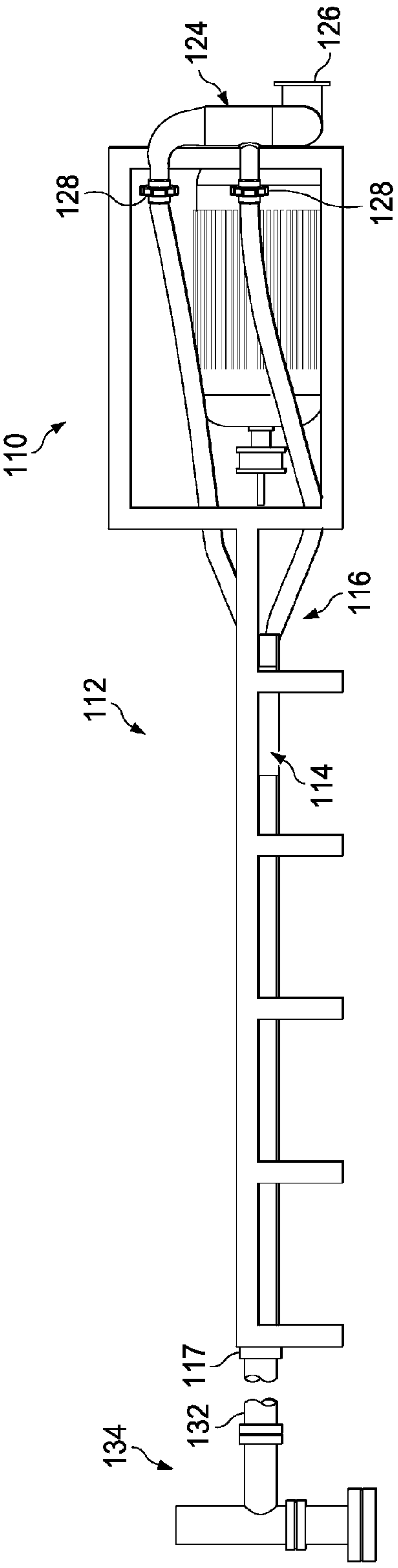
FIG. 6 is an elevation view of the horizontal skid pump and high flow intake system of the invention attached to a wellhead.

Distribution manifold 124 (FIGS. 3, 5, 6) is provided having an inlet 126 and a plurality of outlets 128. A plurality of hoses 130 is provided wherein each of hoses 130 connects one of the plurality of outlets 128 of distribution manifold 124 with one of plurality of inlet members 122 of collar member 120. As can be seen in FIGS. 5 and 6, inlet 126 of distribution manifold 124 is oriented approximately parallel to horizontal pump body 114. Plurality of outlets 128 of distribution manifold 124 are also oriented approximately parallel to horizontal pump body 114. Preferably, each of hoses 130 has a length that is at least 20 times the inner diameter of hose 130 so that fluid passing through hose 130 may develop laminar flow.

Figure 1:
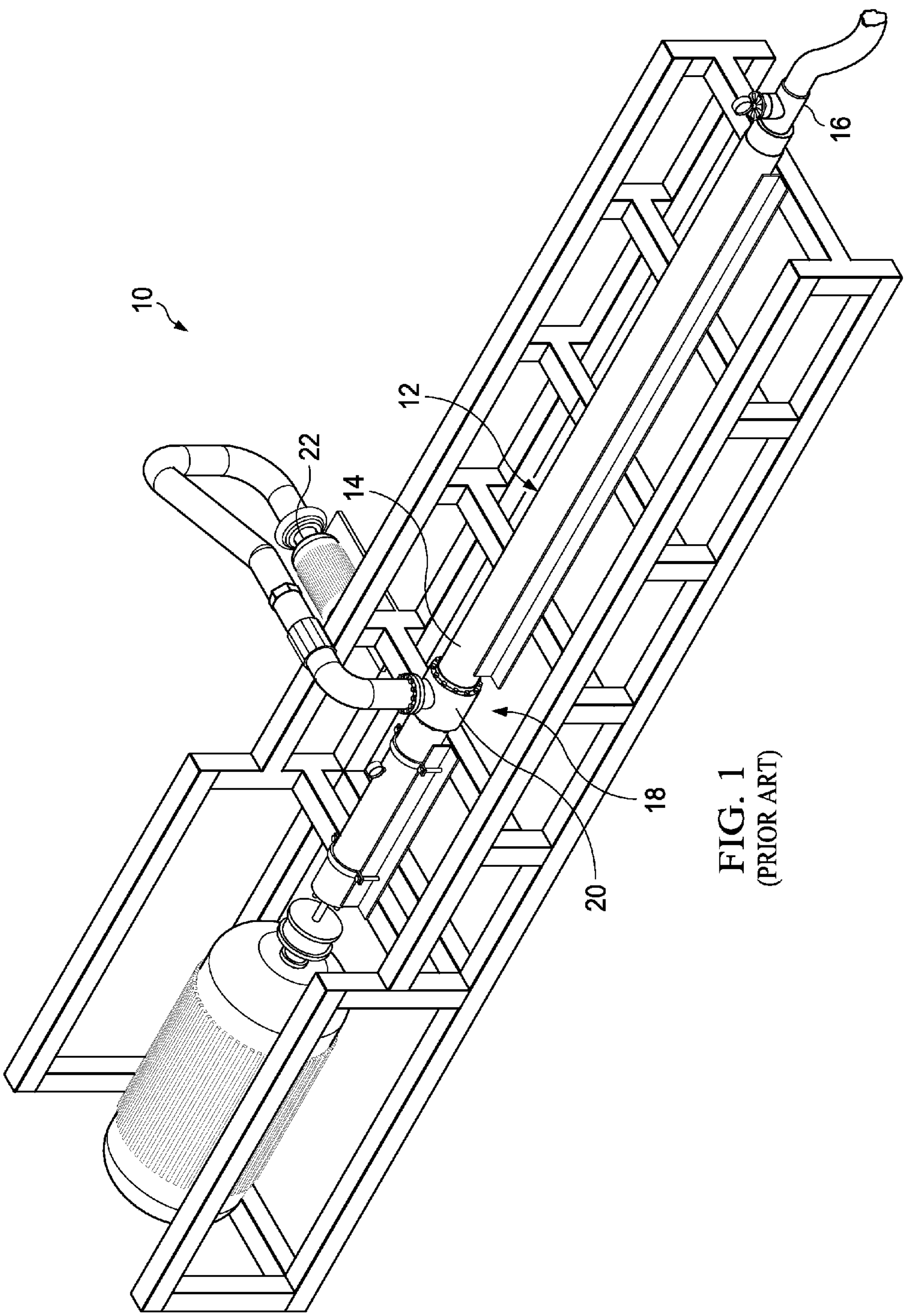
FIG. 1 is a perspective view of a typical prior art horizontal pump skid installation used in the oil and gas industry.
Figure 2:
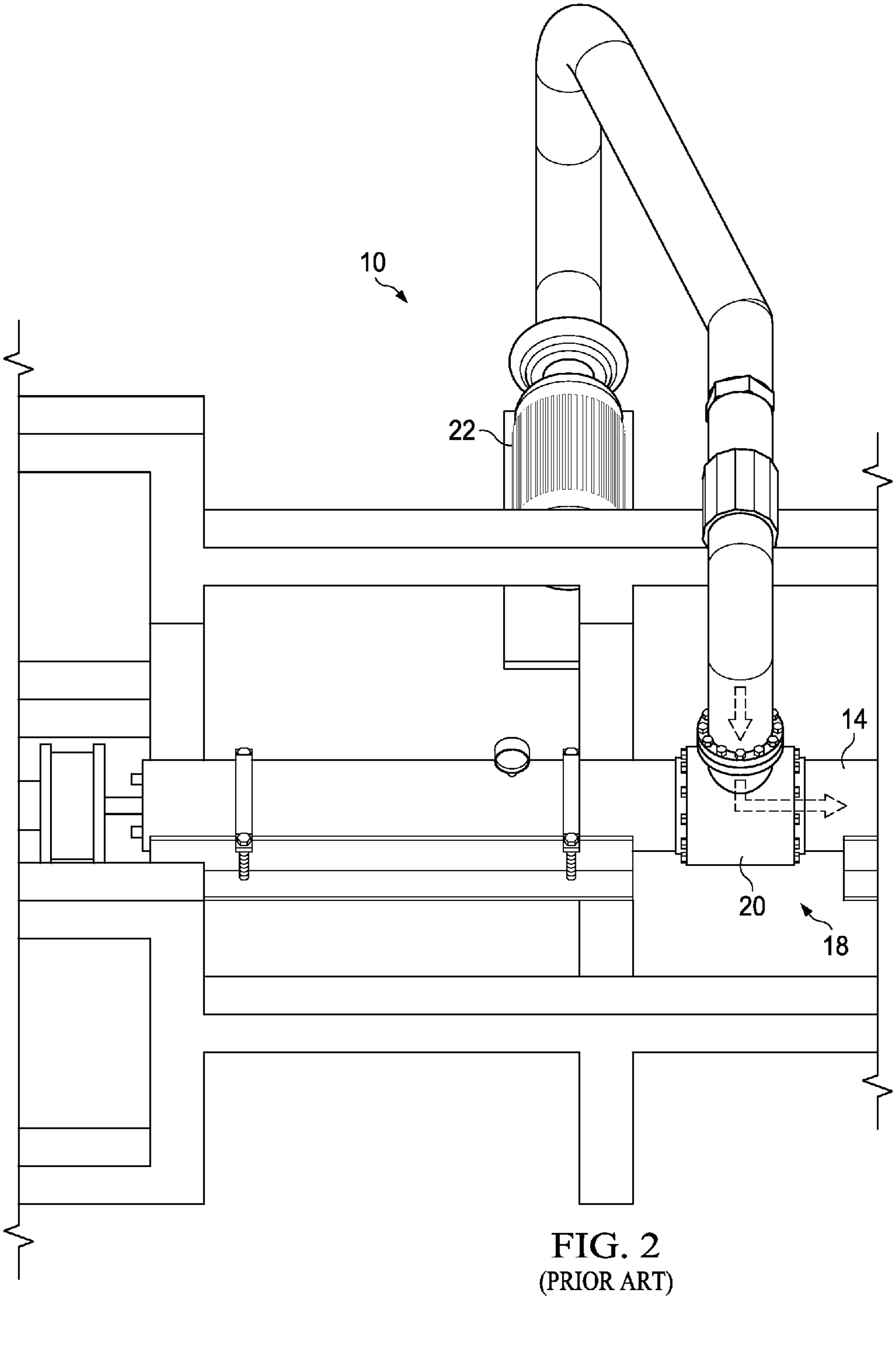
FIG. 2 is an enlarged perspective view of the prior art intake system of FIG. 1.

As can be seen in FIG. 3, the single 90 degree intake of right angle fitting 20 at the pump intake 14 of FIGS. 1 and 2 is replaced by a plurality, e.g., four (4), intakes at inlet members 122. Inlet members 122 are oriented at an angle to the pump body, i.e., at 25° to 45°, preferably at 30 degrees with respect to a longitudinal axis of collar member 120 and pump body 114. A length of hose 130 is provided between the distribution manifold 124 and inlet members 122 of high flow intake system 110 that is at least 20 times inner diameter of hose 130 so that fluid passing through hose 130 may develop laminar flow. The "20×" is a common rule of thumb in fluid mechanics that allows the flow to fully develop in the laminar region.

Pump outlet 117 is connected to transfer line 132 (FIGS. 5 and 6) that is in fluid communication with wellhead 134 of well 138 (FIG. 5). Well 138 includes casing 136.

The high flow intake system 110 of the present disclosure eliminates cavitation by allowing the flow incoming to pump body 114 to develop into laminar flow and by reducing the pressure drop across the intake system 110, which reduces or eliminates the need for a boost pump such as boost pump 22.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A high flow horizontal pump skid system comprising:

a distribution manifold having an inlet and a plurality of outlets;

a pump inlet assembly having a collar member that defines a single outlet and plurality of inlet members that receive fluid from said plurality of outlets of said distribution manifold;

a plurality of passages for connecting each of said plurality of outlets to one of said plurality of inlet members, said passages having a length sufficient to develop laminar flow of fluid flowing therein;

a horizontal pump body affixed to said pump inlet assembly for receiving fluid from said outlet of said collar member;

wherein said inlet of said distribution manifold is oriented approximately parallel to said horizontal pump body; and wherein said plurality of outlets of said distribution manifold is oriented approximately parallel to said horizontal pump body.

2. The high flow pump skid system according to claim 1 wherein:

said plurality of inlet members comprise four inlet members.

3. The high flow pump skid system according to claim 1 wherein:

said plurality of inlet members protrude from said collar member at an angle from a longitudinal axis of said pump body.

4. The high flow pump skid system according to claim 3 wherein:

said angle is between approximately 25° and 45°.

5. The high flow pump skid system according to claim 4 wherein:

said angle is approximately 30°.

6. The high flow pump skid system according to claim 1 wherein:

each of said plurality of passages has a length and an inner diameter; and said length is at least 20 times said inner diameter so that fluid passing through each of said plurality of passages develops laminar flow.

7. A well comprising:

a distribution manifold having an inlet and a plurality of outlets;

a pump inlet assembly having a collar member that defines a single outlet and plurality of inlet members that receive fluid from said plurality of outlets of said distribution manifold;

a plurality of passages for connecting each of said plurality of outlets to one of said plurality of inlet members, said passages having a length sufficient to develop laminar flow of fluid flowing therein;

a surface mounted horizontal pump body having a longitudinal axis, an intake and an outlet, said intake for receiving fluid from said outlet of said collar member;

an outlet line affixed to said outlet of said horizontal pump body;

a wellhead above a wellbore, said wellhead affixed to said outlet line;

wherein said inlet of said distribution manifold is oriented approximately parallel to said horizontal pump body; and wherein said plurality of outlets of said distribution manifold is oriented approximately parallel to said horizontal pump body.

8. The well according to claim 7 wherein:

said plurality of inlet members comprise four inlet members.

9. The well according to claim 7 wherein:

said plurality of inlet members protrude from said collar member at an angle from said longitudinal axis of said pump body.

10. The well according to claim 9 wherein:

said angle is between approximately 25° and 45°.

11. The well according to claim 10 wherein:

said angle is approximately 30°.

12. The well according to claim 7 wherein:

each of said plurality of passages has a length and an inner diameter; and said length is at least 20 times said inner diameter so that fluid passing through each of said plurality of passages develops laminar flow.

* * * * *